April 24, 1962 W. B. EMMS 3,030,820
POSITIONING OF BODIES IN THREE DIMENSIONS
Filed April 14, 1959 7 Sheets-Sheet 1
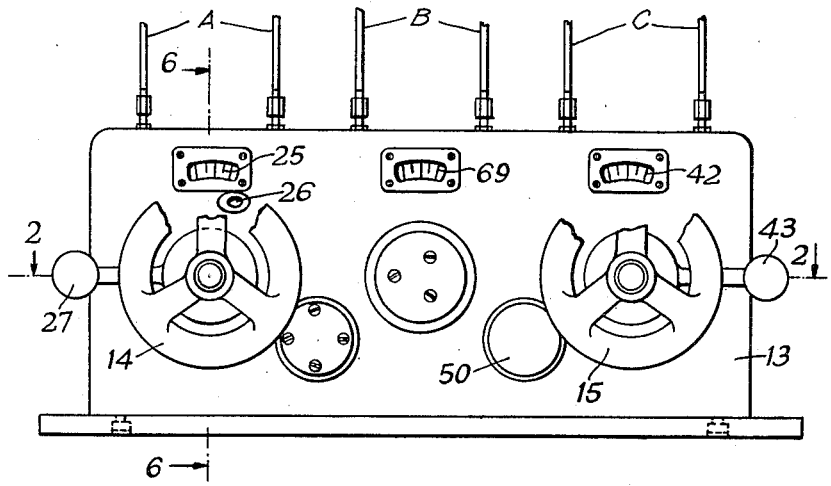
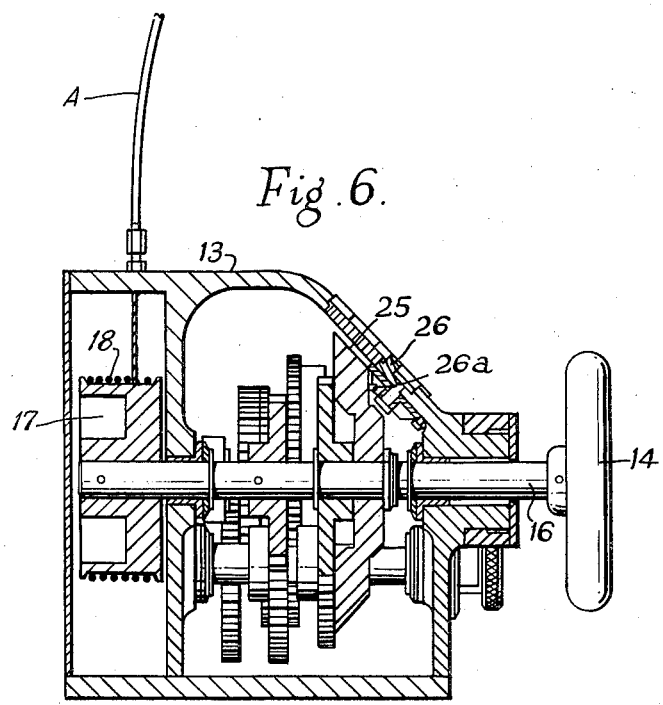
INVENTOR
WILLIAM B. EMMS
BY Moor & Hall
ATTORNEY

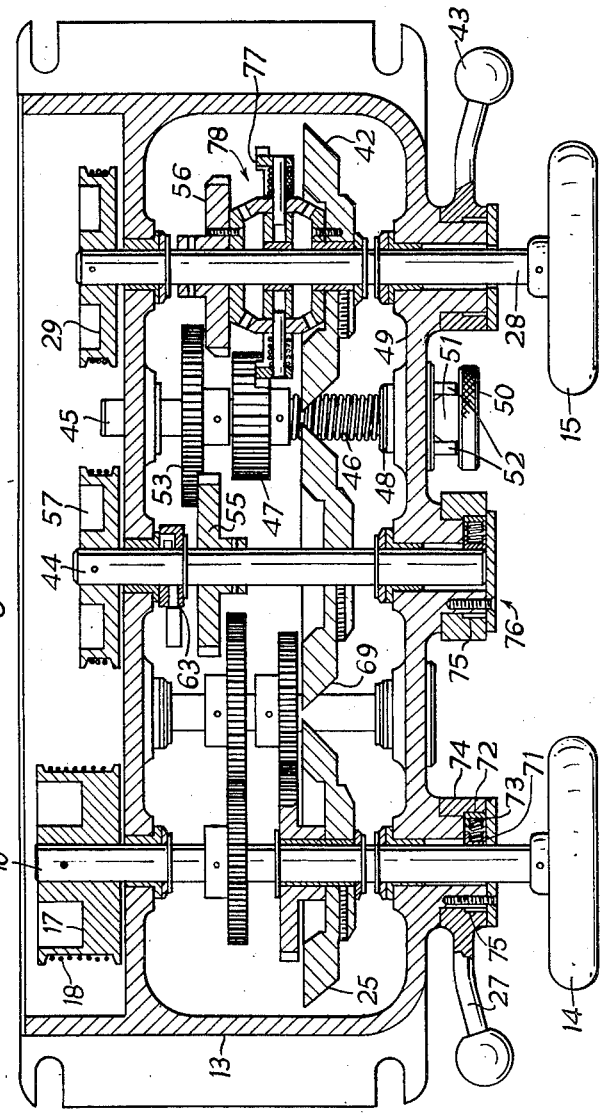

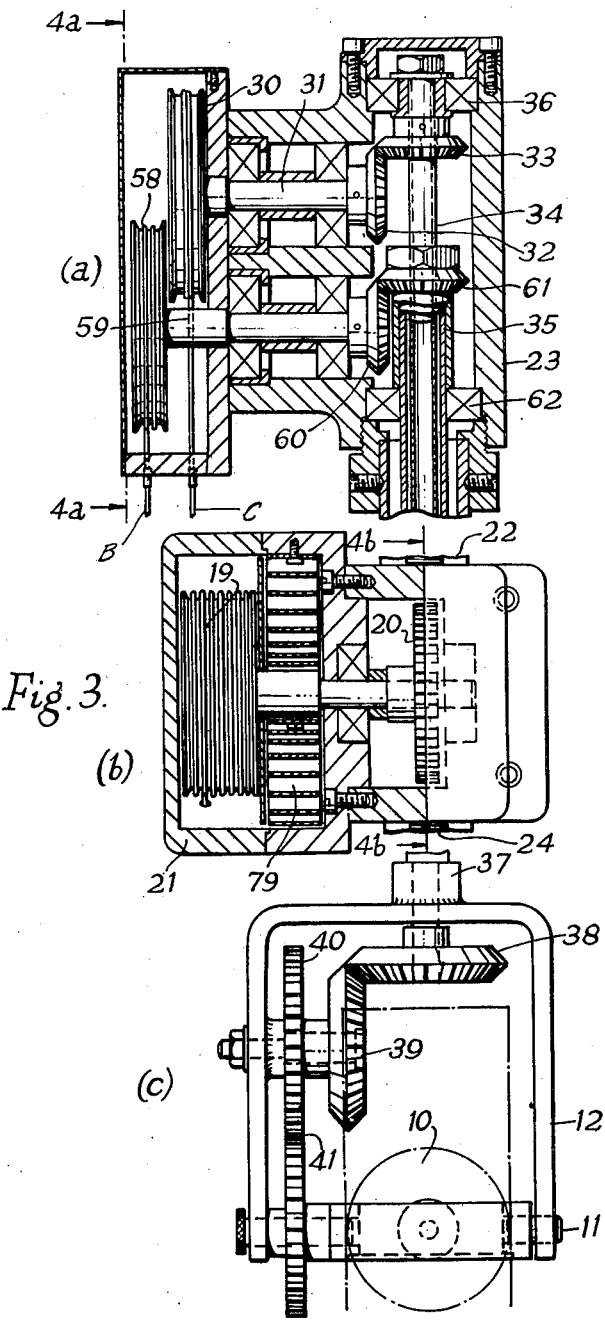

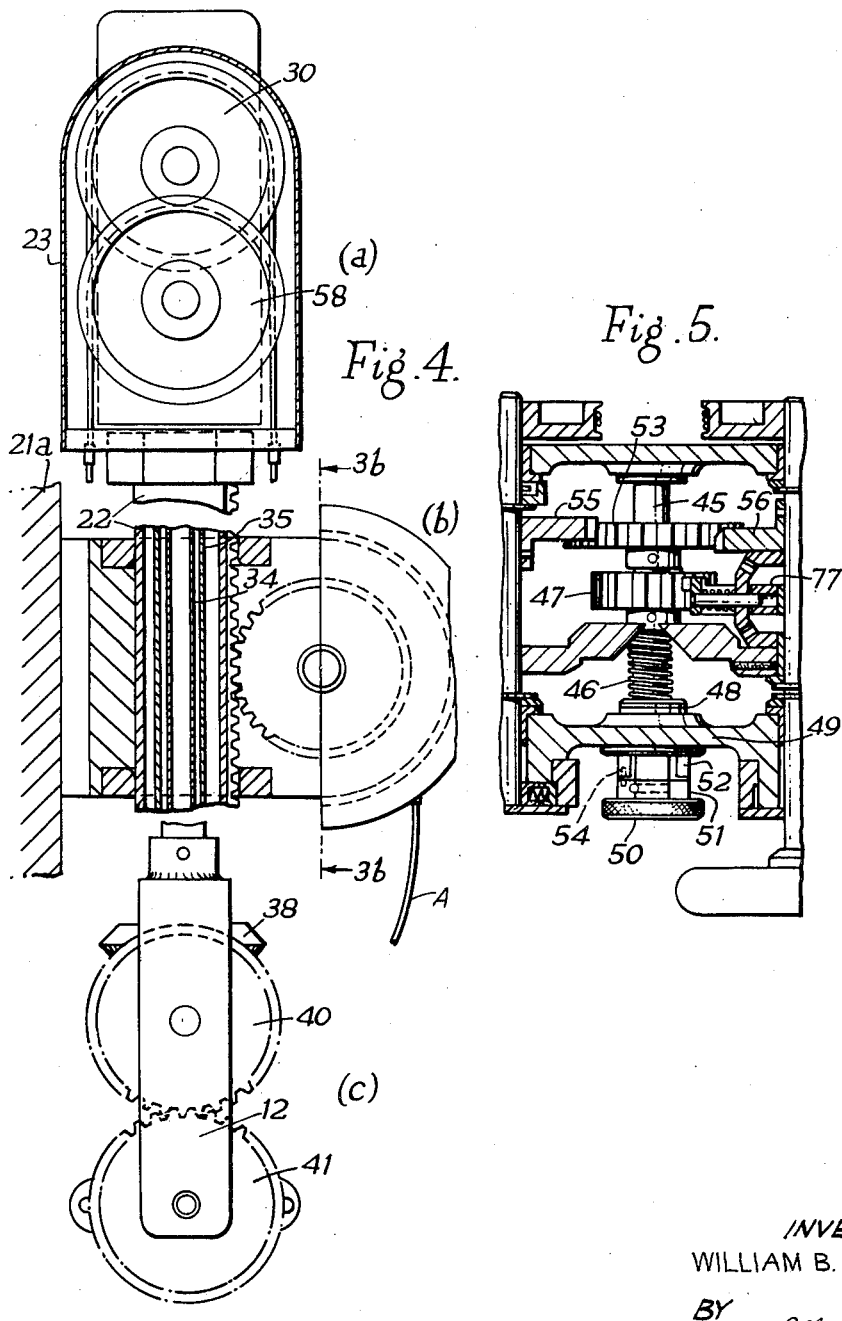

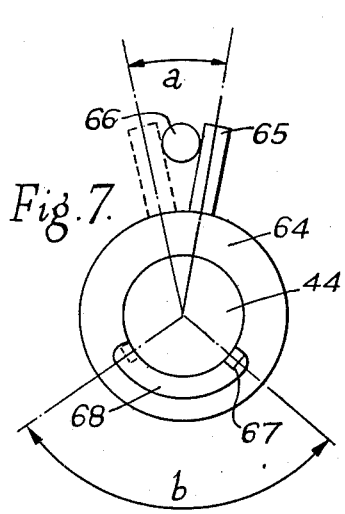
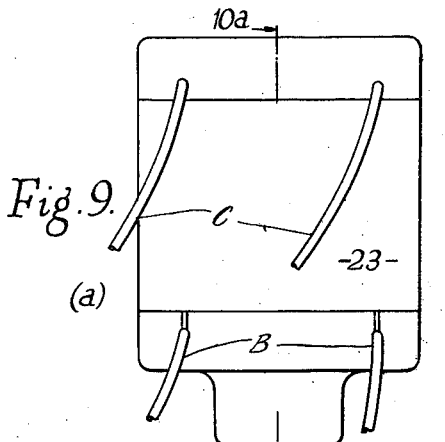
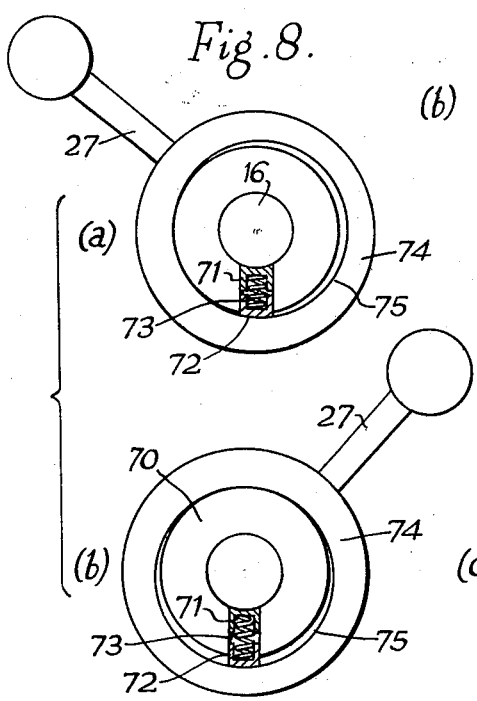
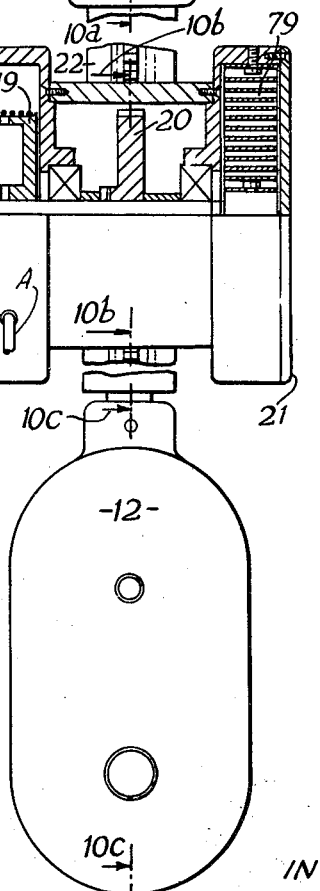

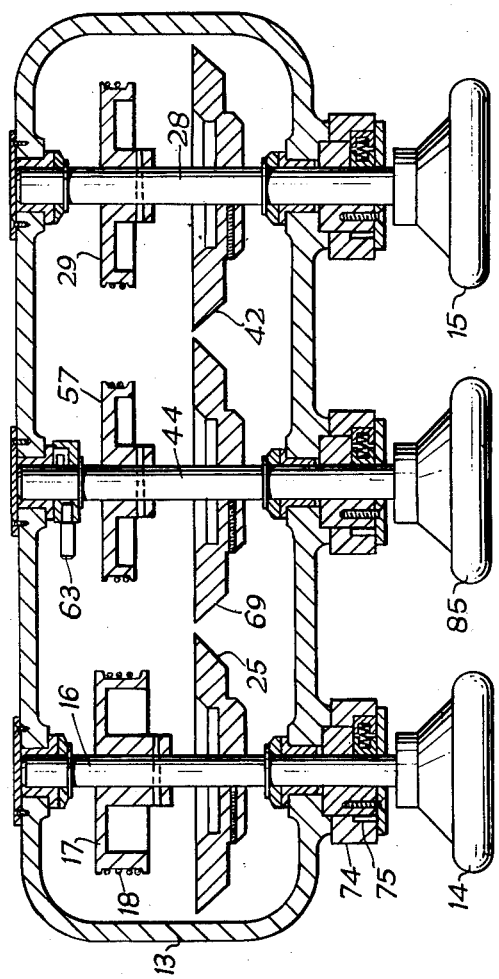

united States Patent Office 3,030,820
Patented Apr. 24, 1962

3,030,820
POSITIONING OF BODIES IN THREE
DIMENSIONS
William Bryan Emms, Husun Works, New North Road,
Barkingside, England
Filed Apr. 14, 1959, Ser. No. 806,236
Claims priority, application Great Britain Apr. 15, 1958
8 Claims. (Cl. 74—483)

This invention relates to the positioning of bodies in three dimensions and has particular reference to means for training a probe of the type used in the ultrasonic inspection of materials or a transducer of the type used in echo sounding and/or echo ranging. In such applications, it is sometimes desired to vary the position of, for example, the probe with respect to a workpiece under inspection by varying the distance in a vertical plane between the probe and the workpiece, by varying the bearing of the probe i.e. by rotating the probe about a vertical axis and by varying the elevation of the probe with respect to the workpiece i.e. by rotating the probe about a horizontal axis to vary the angle of tilt of the probe with respect to the workpiece.

It is an object of this invention to provide improved means enabling a body to be positioned in three dimensions, such means being well adapted for operation by remote control.

According to the present invention, means for positioning a body comprise, a bracket in which the body is mounted for rotary movement about a first axis, a first shaft rotatable to effect the said movement about the first axis, a second shaft coaxial with the first shaft, carrying the bracket, and rotatable to effect rotation of the bracket about a second axis inclined relatively to the first axis, a third shaft surrounding and coaxial with the first and second shafts and adapted to be moved axially to impart axial movement to the bracket.

In a preferred form of the invention, the third shaft is prevented from rotating and the axial movements of this shaft are transmitted to the first and second shafts.

According to a subsidiary feature of the invention there is provided a control unit adapted to be located remote from the said positioning means, the control unit having control members coupled to the positioning means by flexible couplings and rotatable to effect the rotation of the first and second shafts and the raising and lowering of the third shaft.

The invention will be described, by way of example, with reference to the accompanying drawings, in its application to the positioning of a probe for use in the ultrasonic inspection of materials by immersion testing methods.

In the drawings:

FIG. 1 is a view in elevation of a control box in one embodiment of the invention;

FIG. 2 is a view in section on the line 2—2 of FIG. 1;

FIG. 3 is a view in elevation of the probe adjusting mechanism of the embodiment, FIG. 3(a) and FIG. 3(b) being in section, the latter on the line 3(b)—3(b) of FIG. 4(b);

Figure 10:
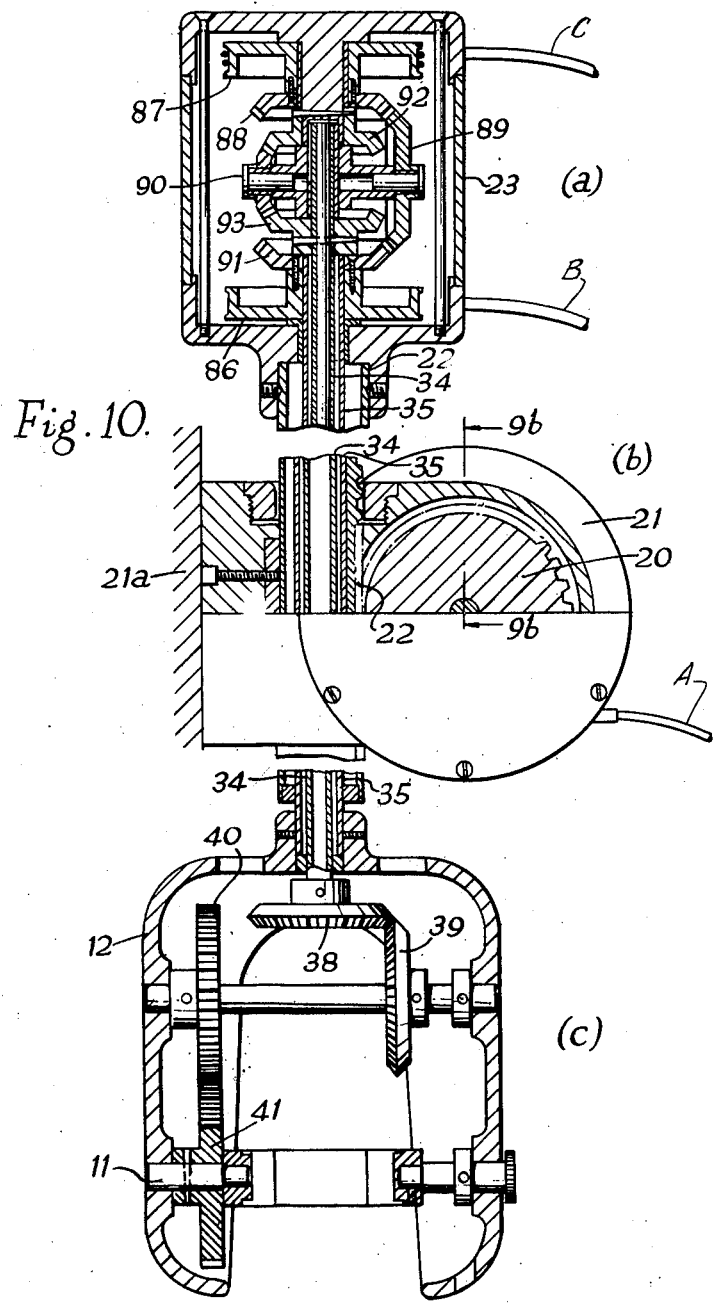

FIG. 4(a) is a view in section on the line 4(a)—4(a) of FIG. 3(a); FIG. 4(b) a section on the line 4(b)—4(b) of FIG. 3(b); FIG. 4(c) a view in side elevation of the part shown in FIG. 3(c);

FIG. 5 shows a part of FIG. 2 with the lay shaft displaced for use when controlling bearing;

FIG. 6 is a view in section on the line 6—6 of FIG. 1;

FIG. 7 is an enlarged diagrammatic view of a telescoping stop in the control box shown in FIG. 2;

FIG. 8(a) and (b) are enlarged views of a locking device shown in FIG. 2 in the unlocked and locked setting respectively;

FIG. 9 is a view in elevation of the probe adjusting mechanism in another embodiment of the invention, FIG. 9(b) being in part section on the line 9(b)—9(b) of FIG. 10(b);

FIG. 10 is a view in side elevation of the mechanism of FIG. 9, FIG. 10(a) being in section on the line 10(a)—10(a) of FIG. 9(a), FIG. 10(b) being in part section on the line 10(b)—10(b) of FIG. 9(b), and FIG. 10(c) being in section on the line 10(c)—10(c) of FIG. 9(c); and FIG. 11 is a view in section of the control box used in the embodiment of FIGS. 9 and 10.

The same references are used for similar parts in all the figures.

Referring to FIGS. 1 to 8, in the apparatus to be described, the workpiece under inspection is assumed to be immersed in a tank of water and the probe assembly is assumed to be supported from a bridge extending across the top of the tank. These details are not shown in the drawings. The probe 10 (FIG. 3) which may be of the type described in the specification of application Serial No. 801,344, filed March 23, 1959, for Ultrasonic Inspection Apparatus, is fixed to a spindle 11 which is rotatably mounted in a bracket 12 for rotation about a horizontal axis to vary the angle of elevation or tilt of the probe in relation to the workpiece.

The positioning means to be described are coupled by flexible drives A, B and C to a control box 13 (FIGS. 1 and 2) which may conveniently be mounted at the tank side or alongside a console which houses the ultrasonic flaw detector apparatus of known kind or alongside a console which houses automatic scanning control means of the type described in the specification of application Serial No. 805,627, filed April 10, 1959, for Mechanisms for Producing Motion of a Body Independently Controllable In Two Mutually Inclined Directions, by means of which the positioning means may be moved relatively to the workpiece.

The control box 13 is provided with two handwheels 14 and 15, the handwheel 14 being operated to raise and lower the probe bracket and the handwheel 15 serving to rotate the probe bracket 12 about a vertical axis to vary the bearing of the probe 10 and also to rotate the probe spindle 11 relative to the bracket in order to vary the elevation or tilt of the probe.

The raise/lower handwheel 14 is mounted on a shaft 16 which is rotated by rotation of the handwheel and carries a drum 17. The drum 17 has wound upon it a flexible stranded wire 18 the two ends of which are coupled by Bowden cables A to another drum 19 at the positioning means, the latter drum driving a spur gear 20 which forms part of the raise/lower drive transmission means. The raise/lower drive transmission means are housed in a height adjustment box 21 through which passes a tubular outer shaft 22 having a manipulator box 23, which houses the bearing and elevation drive transmission means, mounted upon its upper end. The height adjustment box 21 is fixed to a bracket, part of which is indicated at 21a, by which the probe assembly is supported, as hereinbefore mentioned, from the bridge over the top of the tank. A spring 79 (FIG. 3) may be provided to counterbalance the weight of the probe assembly and manipulator box.

The rotary motion transmitted via the Bowden cables A rotates the spur gear 20 which engages with a rack 24 attached to the outside of the tubular outer shaft 22 thereby raising or lowering this shaft (depending on the direction of rotation of the handwheel 14) and carrying with it the probe bracket 12 and the manipulator box 23.

Preferably, the distance of the probe 10 from the workpiece is indicated on a dial 25 which may be viewed through a window provided in the control box face. This dial is actuated through the gearing shown in FIG. 2 by rotation of the shaft 16 attached to the raise/lower handwheel 14 and may be arranged to give fine readings, for example in one-sixteenths of an inch. A second dial 26 shown in FIG. 6 may be marked in feet to give coarse readings and is arranged to be advanced by one step for every rotation of the dial 25 by means of a pin 26a fixed to the dial 25. The probe may be locked at a desired height by means of a locking lever 27 located on the outside of the control box and associated with the raise/lower handwheel and shaft. The way this locking lever operates will be described later.

The elevation and bearing handwheel 15 is mounted directly on an elevation output spindle 28, rotation of the handwheel thereby resulting in rotation of the spindle. The rotary motion of this spindle is transmitted from a drum 29 fixed to the spindle 28 through a part of Bowden cables C to a drum 30 on an input spindle 31 in the manipulator box 23. This input spindle carries at its output end a bevel gear wheel 32 which engages with a second bevel gear wheel 33 mounted on an inner shaft 34 which is coaxial with and mounted within an intermediate tubular shaft 35 which is coaxial with and mounted within the outer shaft 22. The rotary motion imparted to the bevel gear wheel 33 at the top of the inner shaft 34 results in rotation of this shaft. The inner shaft is supported at its upper end inside the manipulator box by a duplex ball bearing 36 and at its lower end it runs in a nylon bush 37 on the probe bracket 12 and carries a bevel gear wheel 38 which engages with a second bevel gear wheel 39 to drive a spur gear wheel 40 which engages with a second spur gear wheel 41 directly mounted on the probe spindle 11. In this way, by rotating the elevation handwheel 15, a rotary motion is imparted to the probe spindle 11 relative to the bracket 12 about a horizontal axis, thereby varying the elevation of the probe.

The elevation of the probe may be indicated in degrees on a dial 42. Locking means 43 may also be provided as for the height position indicator.

In order to vary the bearing of the probe assembly, a bearing output shaft 44 is provided in the control box. A lay shaft 45 which runs parallel with and between the bearing output shaft 44 and the elevation output spindle 28 is also provided. The lay shaft is axially slidable to a limited extent and is spring loaded by a spring 46 which bears between a spur gear wheel 47 fixed to the lay shaft and a bush 48 rotatable in a part 49 of the casing 13. A knob 50 is fixed to the lay shaft 45 and has fixed thereto a web 51 normally lying between two stops 52 fixed to the bush 48. A further spur gear wheel 53 is fixed to the lay shaft 45 and is out of engagement when the lay shaft is in its inner position shown in FIG. 2. When, however, the knob 50 is pulled forward against the action of the spring 46 and turned through 90° to the position shown in FIG. 5, the web 51 rests upon the ends of the stops where it is locked by a pin 54 engaging in a corresponding aperture. In this forward position of the lay shaft 45 the spur gear wheel 53 engages with a spur gear wheel 55 on the bearing output shaft 44 and another spur and bevel gear wheel 56 on the elevation output spindle 28. Rotation of the elevation handwheel 15 then results in rotation of the bearing output shaft 44 and this rotary motion is transmitted from a drum 57 fixed to the bearing output shaft 44 by Bowden cables B to a drum 58 fixed to a bearing input shaft 59 in the manipulator box. This bearing input shaft carries at its output end a bevel gear wheel 60 which engages with a further bevel gear wheel 61 carried by the intermediate tubular shaft 35. The motion imparted to the bevel gear mounted on this intermediate shaft results in rotation of this shaft. This shaft is located near its upper end in a duplex ball-bearing 62 mounted in the manipulator box. Rotation of the intermediate shaft thereby results in rotation of the probe bracket 12, and hence the probe itself, about a vertical axis, the height adjustment box 21, of course, not rotating.

Preferably, a telescoping stop 63 is provided in the control box ensuring a maximum permissible rotation of 405° i.e. 1.125 revs. This telescoping stop is shown in more detail in FIG. 7. It comprises a collar 64 rotatable on the shaft 44 and carrying a pin 65 co-operating with a pin 66 fixed to the casing 13. A pin 67 fixed to the shaft 44 works in a slot 68 in the collar 64. Movement of the pin 67 in the collar 64 is limited to the angle $b$ while movement of the collar relative to the casing is limited to an angle $360° - a$. The total permitted rotation of the shaft 44 is therefore $360° - a + b$. Locking means 76 may also be provided for locking the bearing output shaft in the control box in the preferred bearing position. The bearing position is indicated on a scale 69 viewed through a further window in the casing 13.

The locking means for the shafts 16, 28 and 44 are alike, excepting that a lever such as 27 or 43 is not provided for the locking means 76, and that for the shaft 16 is shown in more detail in FIG. 8. The shaft 16 is rotatable in a boss 70 fixed to the casing, a plunger 71, 72 in two parts having a spring 73 between them being slidable in a radial slot in the boss. The locking lever 27 is fixed to a clamping ring 74 rotatable on the boss 70 and having near its front an eccentric bore 75. When the lever 27 is in the position $(b)$ the two parts 71, 72 of the plunger are separated and negligible pressure is exerted on the shaft 16. When, however, the lever 27 is moved to the position shown at $(b)$ the plunger 71, 72 is forced, by the action of the eccentric bore, against the shaft and locks the shaft to the boss 70.

After the bearing setting has been completed, the knob 50 may be rotated back through 90° when the spring tension will be released and the knob and lay shaft will retract thus causing the spur gear wheel 53 on the lay shaft to disengage.

It is a further feature of the apparatus illustrated in FIGS. 1 to 8 that means are provided for making bearing adjustments without affecting the elevation of the probe or the setting on the elevation indicator. For this purpose it is arranged that the gear ratios between the spur gears 56 and 53 and between the spur gears 53 and 55 are both 1:1. Further, it is arranged that the gear ratio between the bevel gear 32 on the elevation input spindle in the manipulator box and the bevel gear 33 carried by the inner shaft is also 1:1. In addition, the gear ratio between the bevel gear 60 on the bearing input shaft and the bevel gear 61 on the intermediate tubular shaft is similarly designed to be 1:1.

The handwheel 15 on the control box which operates the bearing output shaft in that box also operates the elevation output spindle and hence the motion transmitted to the bearing input shaft in the manipulator box is also transmitted and in the same degree to the elevation input spindle 31 in the manipulator box and thereby to the bevel gear 32 carried at the end of that spindle which engages with the bevel gear 33 carried by the inner shaft 34. As this inner shaft is, however, rotated by virtue of the motion transmitted by the bearing input shaft 59, and as the gear ratios throughout, as has been explained, are 1:1, the bevel gear 32 on the elevation spindle 31 locks with the bevel gear 33 on the inner shaft 34, no motion is transmitted to the probe spindle 11 and hence the elevation of the probe is unaffected.

However, normally, rotation of the elevation/bearing handwheel 15 and hence of the elevation shaft 28 in the control box would affect the elevation indicator. In order to counteract this effect during bearing settings, a differential 78 is provided mounted on the indicator means 42 on the elevation shaft 28 and between those means and the spur gear 56 on that shaft. The cage 77 of the differential is in engagement with the spur gear 47 on the lay shaft and is thus subjected to the rotation of that spur gear and the lay shaft. The motion of the cage thus counteracts the motion imparted by the elevation output shaft to the elevation indicator 42 and hence the elevation indicator setting is unaffected during bearing setting. After bearing has been set the lay shaft 45 is released thus disengaging the spur gear 53 from the spur gear 56 on the elevation output spindle but not from the spur gear 55 on the bearing output shaft. The spur gear 47 on the lay shaft remains in mesh with the differential cage 77. During elevation setting, therefore, the differential cage is held stationary and the rotation of the elevation output shaft 28 actuates the elevation indication in the normal way.

Referring now to FIGS. 9 to 11, the embodiment shown in these figures differs from that already described mainly in that the construction of the control box 13 is simplified by the omission of the differential and modified by the provision of three separate hand wheels for control of height, bearing and elevation, the differential being transferred to the manipulator box 23. Thus in FIG. 11 it is seen that a handwheel 85 is provided for operating the bearing output shaft 44. A telescoping stop 63 is provided as before and each of the shafts 16, 44 and 28 is provided with a locking device as already described.

It will be seen from FIGS. 9 and 10 that the height adjustment box 21 shown at (b) and the probe assembly shown at (c) are in essence the same as those of the previously described embodiment. The manipulator box 23 shown at (a) has a drum 86 driven through cables B from the bearing output shaft 44 and fixed to the intermediate shaft 35. A drum 87 driven by cables C from the elevation output shaft 28 has fixed thereto a bevel gear 88 driving through a bevel gear 89 the cage 90 of a differential. A bevel gear 91 fixed to the intermediate shaft 35 also meshes with the bevel gear 89. One sun wheel 92 of the differential is fixed to the drum 87 and the other sun wheel 93 is fixed to the inner shaft 34.

In this way rotation of the drum 87 effects rotation of the inner shaft 34 (and hence rotation of the proble spindle 11) without producing rotation of the intermediate shaft 35 and rotation of the drum 86 effects rotation of the intermediate shaft 35 (and hence rotation of the probe assembly about a vertical axis) without producing rotation of the inner shaft 34.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. Means for positioning a body comprising a bracket in which the body is mounted for rotary movement about a first axis, a first rotatable shaft, means coupling said first shaft to said body to effect the said movement about the first axis, a second shaft coaxial with the first shaft, carrying the bracket, and rotatable to effect rotation of the bracket about a second axis inclined relatively to the first axis, a third shaft surrounding and coaxial with the first and second shafts, coupled to said bracket and adapted to be moved axially to impart axial movement to the bracket.

2. Positioning means according to claim 1, comprising means preventing the third shaft from rotating and means transmitting the axial movements of said third shaft to the first and second shafts.

3. Positioning means according to claim 1 further comprising a control unit adapted to be located remote from the said positioning means, the control unit having rotatable control members, and flexible couplings coupling said control members to said first, said second and third shafts, rotation of said control members effecting the rotation of the first and second shafts and the raising and lowering of the third shaft.

4. Positioning means according to claim 1 comprising driving means having two independently operable first and second drive members imparting rotational movement to said first and second shafts, respectively, and gear means coupled between said driving means and said first and second shafts for preventing the rotation of said first and second shafts taking place as a result of rotation of said second and first shafts, respectively.

5. Positioning means according to claim 4, wherein the said gear means is a differential gear supported by the third shaft.

6. In combination in an ultrasonic scanning device for making measurements by use of ultrasonic waves, means for controlling the relative positions of an ultrasonic transducer-probe and an object under observation comprising mounting means for said transducer-probe, means for changing the relative positions of said transducer-probe and said object with respect to a selected set of coordinates, and indicating means for quantitatively indicating the relative positions of said transducer-probe and said object in accordance with said selected set of coordinates.

7. The combination set forth in claim 6, said means for changing the relative positions of said transducer-probe and said object comprising means for accomplishing at least one of the actions in the class including varying the distance in a vertical plane between said probe and said object, rotating said probe about a vertical axis, varying the elevation of the probe with respect to the object, rotating said probe about a horizontal axis to vary the angle of tilt of said probe with respect to said object.

8. The combination set forth in claim 7, said indicating means having plurality of indications giving coarse and fine readings and locking means for said transducer probe.

References Cited in the file of this patent

UNITED STATES PATENTS 2,835,892    Szekely  ---------------- May 20, 1958
2,930,255    Bryson  ---------------- Mar. 29, 1960